May 24, 1932. F. MARTI 1,860,260
DRIVE CONTROL SYSTEM FOR CLOCKWORKS, METERS, AND THE LIKE
Filed Feb. 19, 1931
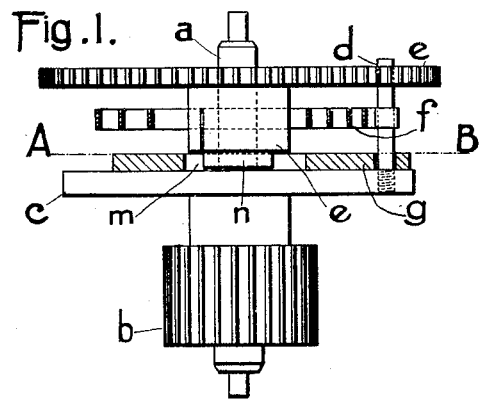
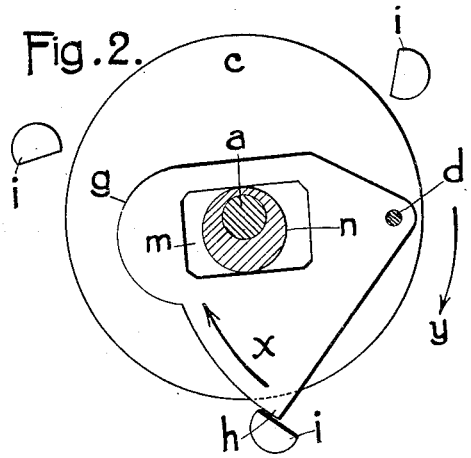
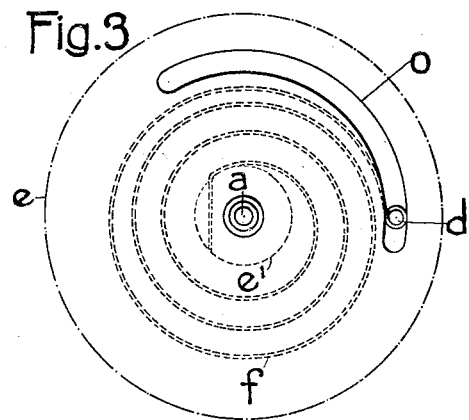
Inventor:-
Fritz Marti
by E. F. Wenderoth
Atty.

Patented May 24, 1932

1,860,260

UNITED STATES PATENT OFFICE

FRITZ MARTI, OF LA CHAUX-DE-FONDS, SWITZERLAND

DRIVE CONTROL SYSTEM FOR CLOCKWORKS, METERS, AND THE LIKE

Application filed February 19, 1931, Serial No. 517,061, and in Switzerland February 28, 1930.

Many devices, provided with a clockwork driving movement, such as electric or mechanical unit meters, masterclocks, time switch mechanisms, owing to their various functions, transmit to the balance wheel or equivalent member of the clock movement a very variable driving force. The device operates, therefore, very irregularly.

The present invention relates to a device for regulating the operation of a rotary member adapted to operate under the action of a driving member in the movements of clocks, indicators and the like which, when interposed, for example, in the gear transmitting the driving force to the escapement and to the balance wheel of a clockwork, completely eliminates the above mentioned disadvantage, rendering the operation quite regular.

According to the present invention, the driving member is operatively connected to the driven member through the intermediary of an initially energized spring or its equivalent and is arranged to be locked periodically by a detent device, while the energized spring or its equivalent itself controls the driven member, the latter being provided with a device adapted to effect the release of the detent device after a predetermined interval of time in order to permit the driving member thus freed to advance, re-energizing the spring or its equivalent, to a new locking position determined by the detent device, after which control of the driven member is again left to the reenergized spring or its equivalent.

The accompanying drawings illustrate by way of example one embodiment of the invention.

Figure 1 is a side view partly in section.
Figure 2 is a sectional view on the line A—B of Figure 1.
Figure 3 is a plan view of the arrangement illustrated in Figure 1.

Referring now to the drawings, the rotary spindle $a$ carries the toothed pinion $b$ which receives the driving force. The pinion $b$ is provided with a circular plate $c$ secured to it and carrying an eccentric pin $d$. On the spindle $a$ is freely mounted a toothed wheel $e$ constituting the rotary driven member which is intended to control, for example, the escapement and the balance wheel of a clockwork.

To the pin $d$ of the plate $c$ is attached the outer extremity of a spiral spring $f$, the inner extremity of which is secured to the cylindrical bush $e^1$ of the toothed wheel $e$. The plate $c$ serves as a support for a lever $g$, which has the pin $d$ as its rotary axis and which is provided with a projection $h$ adapted to cooperate like a detent with one or other of several fixed stops $i$, provided at equal distances from one another around the plate $c$, the number of which may vary. The lever $g$ has an opening $m$ in which an eccentric member $n$ secured to the cylindrical bush $e^1$ of the wheel $e$, engages as shown in Figure 1.

In the position shown in Figure 2, the projection $h$ abuts against one of the stops $i$, thus preventing rotary movement of the plate $c$ and therefore of the pinion $b$, which is thus held at rest or locked. In this position the spiral spring $f$, which is already energized, serves to assure the normal operation of the escapement and of the balance wheel of the clockwork, the wheel $e$ rotating under the action of the spiral spring $f$ at a speed controlled by the escapement. The eccentric member $n$ rotates together with the wheel $e$ imparting to the lever $g$ an angular movement in the direction of the arrow $x$ (Figure 2), and causing the projection $h$ gradually to disengage from the stop $i$ with which it is in contact. At a predetermined instant, the projection $h$ escapes from the said stop $i$, and the plate $c$, under the action of the driving force of the pinion $b$, rotates suddenly in the direction of the arrow $y$.

Due to this rotary movement, the lever $g$ is again moved outwards and its projection $h$, projecting again over the edge of the plate $c$, comes into contact with and is locked by the next stop $i$. During this sudden forward movement, the spiral spring $f$ is again energized as at the beginning of the working period described, and the same process is repeated continually.

The end of the pin $d$ enters a curved slot $o$ in the wheel $e$ in order to limit the unwinding of the spiral spring when there is no driving force.

By means of this device, the transmission of a regular driving force to the escapement of a balance wheel is obtained, i. e., that of the spiral spring $f$ whatever the force acting on the pinion $b$, the surplus driving force being absorbed by contact with the stops $i$.

What I claim is:—

1. In a drive control system for clockworks, meters and the like, the combination of a driving member, a driven member, intermediate tensioning means arranged to operatively connect the driving member to the driven member, a detent device to lock periodically the driving member, while the energized tensioning means control the driven member, said detent device comprising, on the one hand, a lever associated to the driving member and provided with a projection and an opening, and on the other hand, a certain number of stops in alternate cooperation with said projection of the detent lever to lock same periodically, and a releasing eccentric member secured to the driven member and engaged in the opening of the detent lever, to release the detent lever after a predetermined interval of time in order to permit the driving member thus freed to advance, while reenergizing the tensioning means, to a new locking position determined by cooperation of said projection of the detent lever with the next stop, after which control of the driven member is again left to the reenergized tensioning means.

2. In a drive control system for clockworks, meters and the like, the combination of a driving member, a driven member, a tensioning spiral spring arranged to operatively connect the driving member to the driven member, a detent device to lock periodically the driving member, while the energized tensioning spiral spring controls the driven member, said detent device comprising, on the one hand, a lever associated to the driving member and provided with a projection and an opening, and on the other hand, a certain number of stops in alternate cooperation with said projection of the detent lever to lock same periodically, and a releasing eccentric member secured to the driven member and engaged in the opening of the detent lever, to release the detent lever after a predetermined interval of time in order to permit the driving member thus freed to advance, while reenergizing the tensioning spiral spring, to a new locking position determined by cooperation of said projection of the detent lever with the next stop, after which control of the driven member is again left to the reenergized tensioning spiral spring.

3. In a drive control system for clockworks, meters and the like, the combination of a driving member, a driven member, intermediate tensioning means arranged to operatively connect the driving member to the driven member, a detent device to lock periodically the driving member, while the energized tensioning means control the driven member, said detent device comprising a plate carried by the driving member, a lever mounted on said plate and provided with a projection and an opening, and a certain number of stops in alternate cooperation with said projection of the detent lever to lock same periodically, and a releasing eccentric member secured to the driven member and engaged in the opening of the detent lever, to release the detent lever after a predetermined interval of time in order to permit the driving member thus freed to advance, while reenergizing the tensioning means, to a new locking position determined by cooperation of said projection of the detent lever with the next stop, after which control of the driven member is again left to the reenergized tensioning means.

In witness whereof I have hereunto signed my name this 10th day of February, 1931.

FRITZ MARTI.